United States Patent Office 3,467,778

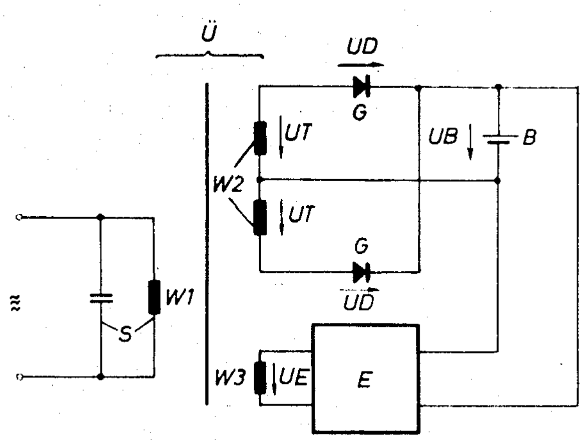
Ü
UD
G
UT
UB
B
W2
UT
G
UD
≈
S
W1
W3
UE
E

Patented Sept. 16, 1969

3,467,778

CIRCUIT ARRANGEMENT FOR POWER SUPPLY AND FOR A CONTROLLED FREQUENCY-MODULATED OPERATION OF A SUB-ASSEMBLY

Armin Konold, Dinkelgarbe, Germany, assignor to International Standard Electric Corporation, New York, N.Y., a corporation of Delaware Filed Feb. 2, 1966, Ser. No. 524,402
Claims priority, application Germany, Feb. 4, 1965, St 23,309
Int. Cl. H04m *19/00*
U.S. Cl. 179—1 6 Claims

ABSTRACT OF THE DISCLOSURE

A mining cage telephone system is provided with means to conserve power. In the mining cage, a transformer is supplied to receive signals and supply them to the telephone receiver. A rectifier is connected to the transformer to receive excess energy not needed to operate the receiver and to divert the excess energy for storage in a floating battery.

The invention realtes to a circuit arrangement for a power supply and particularly for controlled frequency-modulated operation of a subassembly in a mining cage telephone system.

It is known to tap a voltage at the discriminator stage in broadcast radio receivers, to be used, e.g. as gain control. One or several amplifier stages precede said discriminator stage; the control voltage is obtained from the amplified signal. The originally received signal has always such a low level that no energy worth mentioning can be derived from it.

In mining cage telephony, it is known to transmit frequency-modulated signals over the hoisting rope to the cage. The receiving facilities consume a certain amount of energy furnished by a battery mounted on the cage. The battery must be removed and charged time and again, being therefore not a technically satisfactory solution.

The level of the signals arriving at the cage is subject to heavy fluctuations. The signal level depends on the momentarily effective length of the hoisting rope and on the linkages of the circuit, formed by the hoisting rope (insulation resistance). When the cage stops at the bottom-most bed of the mine the maximum effective hoisting rope length is extended. In this position, the receiving device for the frequency-modulated signals must have a sufficiently high output level. As the effective hoisting rope length is shortened, the output level on the receiving device for frequency-modulated signals would rise; keeping, at first, within an admissible tolerance range. As the effective hoisting rope length is shortened, a point may be reached where an excessive signal level in the receiving devices occurs. It is known from the transmission technique to prevent the excessive signal level in a receiving device by limiting the amplitude. Limitation of the frequency-modulated oscillation in front of or in the discriminator stage is even necessary, so that the demodulated signal is not distorted by amplitude fluctuations of the frequency-modulated carrier.

It is a primary object of the invention to provide a signal at a desired level to a receiving device for frequency-modulated signals and particularly to a mining cage telephone system by simple means which make the signal level independent of the length and the quality of the transmission path.

It is a further object of the invention to provide energy, required for the operation of the receiving device, to a floated battery.

The circuit arrangement according to the invention, solves these problems by providing on the receiving end a transformer with two secondary windings. The first of these windings is connected with the receiving device for the frequency-modulated signals and the second one is connected directly with the floated battery via a rectifier arrangement.

The turns of the first secondary winding are selected so that the minimum arriving energy will operate the receiver. In all more favourable positions of the cage, excessive energy reaches the receiving end of the cage telephone system. According to the invention, this excessive energy is kept out of the receiving device for the frequency-modulated signals and transmitted instead to the floated battery via a second secondary winding and a rectifier arrangement.

Since the cage nearly always is in a proper position for transmission and stops only for a relatively short time on the bottom-most bed of the mine, the quantity of energy consumed in constant operation by the receiving device for frequency-modulated signals can be easily transmitted to the consumer with the aid of such a circuit arrangement. Thereby no energy is needed beyond that necessary for transmitting the frequency-modulated signals.

The winding turns ratio of both secondary windings is selected so that the response value of the amplitude-limiting rectifier arrangement corresponds to the value of the arriving energy at which overmodulation of the receiving device for the frequency-modulated signals would commence.

The circuit arrangement is now explained with the aid of the accompanying drawing. It represents a functional block diagram of the receiving end of a cage telephone system. The arriving narrow band frequency-modulated oscillation at first reaches the oscillating circuit S. The voltage applied to the winding W1 of the oscillating circuit is transmitted to the windings W2, W3 of the transformer U. As soon as the voltage UT across the winding W2 exceeds the voltage value $UD+UB$, the voltage UE is limited and the battery B is charged. In this manner an overmodulation of the receiving device E for frequency-modulated signals is prevented by the rectifier arrangement G and the battery B receives the excessive energy for recharging.

In a preferred embodiment, the secondary windings W2 and W3 may consist of a single winding instead of the two windings shown in the figure. If a single winding is used, three tappings to provide two potentials UT (as shown in the figure) and a potential UE are provided.

While the principles of the invention have been described above in connection with specific apparatus and applications, it is to be understood that this description is made only by way of example and not as a limitation on the scope of the invention.

What is claimed is:

1. A circuit arrangement for a controlled frequency-modulated mine cage telephone system comprising
   a telephone line,
   a transformer having a primary winding and first and second secondary windings,
   means coupling said primary winding across said telephone line,
   a receiver,
   means coupling said first secondary winding to said receiver,
   a floating battery,
   a rectifier, and
   means coupling said floating battery and said rectifier to the second secondary winding to permit the transfer of energy to the battery.

2. A circuit arrangement for a controlled frequency-modulated mine cage telephone system substantially as claimed in claim 1, in which said first secondary winding includes a number of turns selected to enable operation of the receiver at a particular energy level.

3. A circuit arrangement substantially as claimed in claim 1, in which the rectifier operates to deliver energy above a fixed value, as indicated by the voltage level, to the battery.

4. A circuit arrangement substantially as claimed in claim 3, in which said second secondary winding is selected to have a number of turns giving the combination of rectifier battery and winding a response value corresponding to said fixed value, as indicated by the voltage level, of arriving energy, said fixed value corresponding to the energy level beyond which overmodulation of the receiver commences.

5. A circuit arrangement substantially as claimed in claim 1, in which the first and second secondary windings are formed from one winding by suitable tapping.

6. A circuit arrangement as claimed in claim 1, in which the rectifier includes two independent rectifier elements, the second secondary winding has a center tap and two end terminals, means are provided connecting the two end terminals of the second secondary winding to a first terminal of the battery through rectifier elements, and means are provided connecting the center tap to the other terminal of the battery.

References Cited

UNITED STATES PATENTS

| | | | |
|---|---|---|---|
| 2,505,144 | 4/1950 | Rutherford | 179—82 X |
| 3,203,506 | 8/1965 | Cummins | 340—19 |

KATHLEEN H. CLAFFY, Primary Examiner

JAN S. BLACK, Assistant Examiner

U.S. Cl. X.R.

179—82; 340—19